(12) United States Patent
Message et al.

(10) Patent No.: US 10,576,838 B2
(45) Date of Patent: Mar. 3, 2020

(54) CONTROLLER FOR A MOTOR VEHICLE AND METHOD

(71) Applicant: Jaguar Land Rover Limited, Whitley, Coventry, Warwickshire (GB)

(72) Inventors: Simon Message, Coventry (GB); Steve Liggins, Coventry (GB); Matthew Hancock, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 58 days.

(21) Appl. No.: 15/770,434

(22) PCT Filed: Oct. 26, 2016

(86) PCT No.: PCT/EP2016/075776
§ 371 (c)(1),
(2) Date: Apr. 23, 2018

(87) PCT Pub. No.: WO2017/089060
PCT Pub. Date: Jun. 1, 2017

(65) Prior Publication Data
US 2018/0312078 A1    Nov. 1, 2018

(30) Foreign Application Priority Data
Nov. 25, 2015 (GB) .................................. 1520817.6

(51) Int. Cl.
*B60L 15/20* (2006.01)
*B60L 7/10* (2006.01)
(Continued)

(52) U.S. Cl.
CPC ................. *B60L 15/20* (2013.01); *B60L 7/10* (2013.01); *B60L 15/10* (2013.01);
(Continued)

(58) Field of Classification Search
CPC ...... B60L 15/10; B60L 15/20; B60L 15/2063; B60L 15/2072; B60L 15/32;
(Continued)

(56) References Cited

U.S. PATENT DOCUMENTS 9,096,226 B2 *   8/2015   Yu .......................... B60W 10/18
2002/0129788 A1 *  9/2002   O'Neil ................... B60W 10/06
                                                         123/350
(Continued)

FOREIGN PATENT DOCUMENTS

JP     2008-230510 A     10/2008
JP     2009-149154 A      7/2009
(Continued)

OTHER PUBLICATIONS

Patents Act 1977: Combined Search and Examination Report under Sections 17 and 18(3), UKIPO Application No. GB1520817.6, dated May 13, 2016, 5 pp.
(Continued)

*Primary Examiner* — Babar Sarwar
(74) *Attorney, Agent, or Firm* — Myers Bigel, P.A.

(57) ABSTRACT

A controller for a motor vehicle powertrain, the controller being configured to control the amount of torque generated by each of a plurality of drive torque sources in order to generate a net torque corresponding to a predetermined torque demand value, the predetermined torque demand value being determined at least in part by reference to a torque demand signal received by the controller, each drive torque source being coupled via a respective torque transfer arrangement to a respective group of one or more wheels, the controller being configured to cause at least one drive torque source to generate positive or negative torque in dependence on the predetermined torque demand value and to cause the drive torque source to undergo a torque reversal
(Continued)

operation in which the direction of torque generated by the at least one drive torque sources changes from one direction to the other, the controller being configured wherein, during a torque reversal operation, the controller limits the rate of change of torque generated by the at least one of the plurality of drive torque sources as the amount of torque generated passes through zero and attempts to compensate for the reduction in rate of change of torque by a corresponding change in the amount of torque generated by one or more other of the plurality of drive torque sources.

18 Claims, 2 Drawing Sheets

(51) Int. Cl.
*B60L 15/10* (2006.01)
*B60L 15/32* (2006.01)
*B60W 30/18* (2012.01)
*B60W 20/00* (2016.01)
*B60W 10/08* (2006.01)
*F16H 57/12* (2006.01)

(52) U.S. Cl.
CPC ....... *B60L 15/2063* (2013.01); *B60L 15/2072* (2013.01); *B60L 15/32* (2013.01); *B60W 10/08* (2013.01); *B60W 20/00* (2013.01); *B60W 30/18127* (2013.01); *F16H 57/12* (2013.01); *B60L 2240/423* (2013.01); *B60W 2710/085* (2013.01); *B60W 2720/403* (2013.01); *B60Y 2200/91* (2013.01); *F16H 2057/123* (2013.01); *Y02T 10/72* (2013.01); *Y02T 10/7275* (2013.01)

(58) Field of Classification Search
CPC ..... B60L 2240/423; B60L 7/10; B60W 10/00; B60W 10/08; B60W 20/00; F16H 2057/123; F16H 57/12; Y02T 10/72; Y02T 10/7275
See application file for complete search history.

(56) References Cited

U.S. PATENT DOCUMENTS

| | | | |
|---|---|---|---|
| 2004/0176899 A1 | 9/2004 | Hallowell | |
| 2011/0276256 A1* | 11/2011 | Kociba | F02D 29/02 701/110 |
| 2013/0054064 A1* | 2/2013 | Tamura | B60W 20/10 701/22 |
| 2013/0297110 A1 | 11/2013 | Nefcy et al. | |
| 2014/0257613 A1 | 9/2014 | Tang | |
| 2015/0120106 A1* | 4/2015 | Yu | B60W 10/18 701/22 |
| 2015/0283996 A1* | 10/2015 | Wang | B60K 6/547 477/3 |
| 2017/0001646 A1* | 1/2017 | Cooke | B60W 50/082 |
| 2018/0312078 A1* | 11/2018 | Message | B60W 20/00 |
| 2018/0312081 A1* | 11/2018 | Hancock | B60L 15/10 |
| 2019/0054913 A1* | 2/2019 | Lad | B60W 50/0097 |

FOREIGN PATENT DOCUMENTS

| | | |
|---|---|---|
| JP | 2015-89735 A | 5/2015 |
| WO | WO 2006/109379 A1 | 10/2006 |
| WO | WO 2015/091051 A1 | 6/2015 |

OTHER PUBLICATIONS

International Search Report and Written Opinion of the International Searching Authority, International Application No. PCT/EP2016/075776, dated Feb. 8, 2017, 11 pp.

Patents Act 1977: Combined Search and Examination Report under Sections 17 and 18(3), UKIPO Application No. GB1520818.4, dated May 16, 2016, 5 pp.

International Search Report and Written Opinion of the International Searching Authority, International Application No. PCT/EP2016/075772, dated Feb. 8, 2017, 12 pp.

* cited by examiner

CONTROLLER FOR A MOTOR VEHICLE AND METHOD

RELATED APPLICATIONS

This application is a 35 U.S.C. § 371 national stage application of PCT Application No. PCT/EP2016/075776, filed on Oct. 26, 2016, which claims priority from Great Britain Patent Application No. 1520817.6, filed on Nov. 25, 2015, the contents of which are incorporated herein by reference in their entireties. The above-referenced PCT International Application was published in the English language as International Publication No. WO 2017/089060 A1 on Jun. 1, 2017.

TECHNICAL FIELD

The present disclosure relates to a controller for a motor vehicle and method. Aspects of the invention relate to a controller and a method.

BACKGROUND

It is known to provide an electrically driven vehicle whereby a battery provides electrical power through an inverter to a drive motor. The drive motor is generally connected to two wheels of the vehicle through a torque transfer assembly that has a transmission coupled to a differential gearbox via a drive shaft. The differential gearbox delivers drive torque to side shafts of the assembly that in turn deliver torque to each of two wheels of the vehicle.

It is a characteristic of torque transfer devices such as geared transmissions and differential gearboxes that backlash is present within each gear mesh thereof and also in supporting bearings. When the direction of torque transmission through the device reverses the backlash is crossed and this can result in the generation of an audible noise and/or jerk experienced by the driver or a passenger. It is to be understood that backlash may be caused by a combination of free play within gearboxes and the torsional compliance of driveline components. An example of backlash is when a vehicle is in an engine overrun operating condition, where a driver may for example have released both an accelerator pedal and a brake pedal of the vehicle, such that the vehicle is slowly decelerating, to a state in which the accelerator pedal is depressed and the vehicle is accelerating. As the powertrain transitions from a state in which energy is being put into the engine in order to overcome frictional forces and a state in which the engine is delivering energy to the powertrain, the driveline transitions from a state of negative torque to positive torque and NVH in the form of a heavy 'thump' may be heard and felt by occupants of the vehicle.

In some cases a hybrid vehicle may be capable of providing drive torque to front wheels of a vehicle from an internal combustion engine and an electrical drive to rear wheels of the same vehicle from an electric machine (and optionally to drive the electric machine via the rear wheels to effect regenerative braking). The hybrid vehicle may be arranged such that the front and rear wheels are not mechanically coupled, i.e. there is no prop shaft connecting the respective sets of wheels.

The proportion of the total required drive torque that is provided by each torque source may be controlled in order to improve the overall efficiency of operation of the vehicle.

It is recognised that the torque distribution between torque sources also affects stability of the vehicle. For example, steering feel and handling balance as experienced by the driver may be controlled by adjusting the relative torque distribution between the two sources. For example, if the electric drive system connected to the rear wheels is operating in an electrical generation mode, recharging a battery of the vehicle, and the road surface is relatively slippery, the amount of regeneration torque developed by the wheels may be limited by a controller of the powertrain in order to maintain stability of the rear wheels.

It is an aim of embodiments of the present invention to reduce noise and/or jerk caused by torque reversal in one or more components of a vehicle torque transfer assembly.

SUMMARY OF THE INVENTION

Aspects and embodiments of the present invention provide a controller, a vehicle and a method. Embodiments of the invention may be understood with reference to the appended claims.

In one aspect of the invention for which protection is sought there is provided controller for a motor vehicle configured to control an amount of torque generated by each of a plurality of drive torque sources, each drive torque source being coupled via a respective torque transfer arrangement to a respective group of one or more wheels, the controller being configured to reduce or limit the rate of change of drive torque generated by a drive torque source when the amount of drive torque generated by said drive torque source approaches zero and reverses direction.

In one aspect of the invention for which protection is sought there is provided a controller for a motor vehicle configured to control an amount of torque generated by each of a plurality of drive torque sources, each drive torque source being coupled via a respective torque transfer arrangement to a respective group of one or more wheels, the controller being configured to reduce or limit the rate of change of drive torque generated by a drive torque source when the amount of drive torque generated by said drive torque source reverses direction.

In one aspect of the invention for which protection is sought there is provided a controller for a motor vehicle configured to control an amount of torque generated by each of a plurality of drive torque sources, each drive torque source being coupled via a respective torque transfer arrangement to a respective group of one or more wheels, the controller being configured to limit the rate of change of drive torque generated by a drive torque source when the amount of drive torque generated by said drive torque source reverses direction.

In an aspect of the invention for which protection is sought there is provided a controller for a motor vehicle powertrain, the controller being configured to control the amount of torque generated by each of a plurality of drive torque sources in order to generate a net torque corresponding to a predetermined torque demand value, the predetermined torque demand value being determined at least in part by reference to a torque demand signal received by the controller, each drive torque source being coupled via a respective torque transfer arrangement to a respective group of one or more wheels, the controller being configured to cause at least one drive torque source to generate positive or negative torque in dependence on the predetermined torque demand value and to cause the drive torque source to undergo a torque reversal operation in which the direction of torque generated by the at least one drive torque sources changes from one direction to the other, the controller being configured wherein, during a torque reversal operation, the controller limits the rate of change of torque generated by the at least one of the plurality of drive torque sources as the amount of torque generated passes through zero and attempts to compensate for the reduction in rate of change of torque by a corresponding change in the amount of torque generated by one or more other of the plurality of drive torque sources.

Thus the controller is configured to attempt substantially continually to meet the predetermined torque demand value even when a torque reversal operation is in progress.

Embodiments of the present invention have the advantage that a severity of backlash experienced by a vehicle when a direction of drive torque applied by a drive torque source reverses may be reduced. In some embodiments the severity of backlash may be reduced to a substantially imperceptible level, optionally substantially to zero.

Some embodiments of the present invention permit a vehicle to be operated within acceptable powertrain noise, vibration and harshness (NVH) constraints using powertrain components of reduced tolerance in a torque transfer arrangement such as a geared torque transfer arrangement. It is to be understood that the use of components of reduced tolerance may permit a reduction in cost of the vehicle to be enjoyed. Alternatively or in addition, a reduction in NVH experienced by vehicle occupants may be enjoyed for a given set of powertrain components compared with a vehicle not according to an embodiment of the present invention. The torque transfer arrangement connecting each drive torque source to the respective one or more wheels may comprise a plurality of gears, or one or more shafts connecting the drive torque source to the respective one or more wheels.

Embodiments of the present invention may be useful in vehicles in which both drive torque sources are electric machines. Some embodiments may be useful in vehicles in which at least one drive torque source is an electric machine. Some embodiments may be useful in vehicles in which at least one drive torque source is an internal combustion engine.

It is to be understood that the controller may be configured to limit the rate of change of drive torque generated by the drive torque source by reducing the rate of change when the amount of drive torque generated by said drive torque source approaches zero and reverses direction. Thus if the rate of change of drive torque exceeds a predetermined limit value as the amount of drive torque approaches zero and reverses direction, the controller may cause a reduction in the rate of change such that it does not exceed the predetermined limit value as the amount of drive torque approaches zero and reverses direction. The predetermined limit value may be a substantially fixed value. Alternatively the predetermined limit value may be determined by the controller in dependence at least in part on one or more parameters. In one embodiment the predetermined limit value is determined at least in part in dependence on vehicle speed. In some embodiments the predetermined limit value may be determined at least in part in dependence on the speed of rotation of at least one electric machine not undergoing reversal of direction. It is to be understood that, the faster the vehicle is moving, or the faster the speed of rotation of the at least one electric machine not undergoing torque reversal, the greater the amount of NVH to which vehicle occupants are likely to be being subjected. Accordingly, a greater proportion of the NVH arising due to the torque reversal operation may be masked by the pre-existing NVH.

It is to be understood that the drive torque generated by a drive torque source may be positive, being in the direction of rotation of a wheel thereby promoting rotation thereof, or negative, being in the direction opposite the direction of rotation, thereby acting against rotation thereof. It is to be understood that negative drive torque may be applied by an electric machine when operated as a generator, for example in order to effect regenerative braking.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors as the controller. Other arrangements are also useful.

The controller may be configured to cause a first drive torque source to apply a positive drive torque to a first group of one or more wheels to which the first drive torque source is coupled and to cause a second drive torque source to apply a negative drive torque to a second group of one or more wheels to which the second drive torque source is coupled, such that a net drive torque applied to wheels of the vehicle corresponds substantially to the predetermined drive torque demand value.

Thus the controller may, subject to the drive torque demand value, cause the first drive torque source to apply a positive drive torque, being drive torque in the direction of rotation or intended rotation of the first group of one or more wheels, and therefore of travel or intended travel, whilst the second drive torque source is caused to apply negative torque to the second group of one or more wheels that is in the opposite direction to that applied by the first drive torque source to the first group of one or more wheels. Thus the torque applied by the second drive torque source opposes that applied by the first. It is to be understood that this features enables the direction of net drive torque to be reversed, from a forward to a reverse direction and vice-versa, without the powertrain experiencing a lash crossing.

It is to be understood that if the amount of the predetermined drive torque demand value exceeds that which the first drive torque source can produce, the second drive torque source may be controlled to undergo torque reversal from generating negative torque to generating positive torque, so as to increase the total net torque applied by the first and second drive torque sources.

Optionally, when a predetermined one or more conditions is met the controller is configured to permit a reversal of the direction of drive torque generated by one or both of the first and second drive torque sources.

It is to be understood that a reversal of the direction of drive torque may be from a condition of delivering negative drive torque to a condition of delivering positive drive torque, for example when the vehicle is accelerating. Alternatively the reversal of drive torque may be from a condition of delivering positive drive torque to a condition of delivering negative drive torque, for example when the vehicle is decelerating.

The controller may be configured to cause a reversal of direction of drive torque applied by one of the first and second drive torque sources from a reverse direction of travel of the vehicle to a forward direction whilst the vehicle is accelerating.

The controller may be configured to cause a reversal of direction of drive torque applied by one of the first and second drive torque sources from a forward direction of travel of the vehicle to a reverse direction of travel whilst the vehicle is decelerating.

The controller may be configured, when the amount of drive torque generated by a drive torque source approaches zero and reverses direction, to limit the rate of change of drive torque generated by said drive torque source such that it does not exceed a predetermined rate limit value.

Thus the controller may impose a limit on the rate of change of drive torque generated by the drive torque source as the direction of drive torque generated by said drive torque source approaches zero and reverses Optionally, the predetermined rate limit value is dependent at least in part on at least one of vehicle speed and the drive torque demand amount.

Optionally, the predetermined rate limit value is higher for higher values of one or both of vehicle speed and the drive torque demand amount.

It is to be understood that higher values of predetermined rate limit value, resulting in higher NVH associated with torque reversal, may be acceptable at higher vehicle speeds In some embodiments the predetermined rate limit value may be arranged to increase in proportion at least in part to one or both of vehicle speed and drive torque demand amount.

The controller may be configured to cause at least one drive torque source comprising at least one electric machine to generate positive or negative torque in dependence on the predetermined torque demand value.

Optionally the controller comprises an electronic processor having an electrical input for receiving the torque demand signal, and an electronic memory device electrically coupled to the electronic processor and having instructions stored therein,
wherein the controller being configured to cause at least one drive torque source to generate positive or negative torque in dependence on the predetermined torque demand value and to cause the drive torque source to undergo a torque reversal operation in which the direction of torque generated by the at least one drive torque sources changes from one direction to the other, comprises the processor being configured to access the memory device and execute the instructions stored therein such that it is configured wherein, during a torque reversal operation, the controller limits the rate of change of torque generated by the at least one of the plurality of drive torque sources as the amount of torque generated passes through zero and attempts to compensate for the reduction in rate of change of torque by a corresponding change in the amount of torque generated by one or more other of the plurality of drive torque sources.

In an aspect of the invention for which protection is sought there is provided a vehicle comprising a body, a plurality of wheels, a powertrain to drive said wheels, a braking system to brake said wheels, a plurality of drive torque sources and a controller according to any preceding claim.

Optionally, at least one of the drive torque sources comprises at least one electric machine.

Optionally, a plurality of the plurality of drive torque sources each comprise at least one electric machine.

The vehicle may further comprise an engine.

Optionally, at least one of the plurality of drive torque sources comprises an internal combustion engine.

In a further aspect of the invention for which protection is sought there is provided a method of controlling by means of an electric controller a motor vehicle powertrain,
the method comprising controlling the amount of torque generated by each of a plurality of drive torque sources in order to generate a net torque corresponding to a predetermined torque demand value, the predetermined torque demand value being determined at least in part by reference to a torque demand signal received by the controller, each drive torque source being coupled via a respective torque transfer arrangement to a respective group of one or more wheels,
the method comprising causing at least one drive torque source to generate positive or negative torque in dependence on the predetermined torque demand value and causing the drive torque source to undergo a torque reversal operation in which the direction of torque generated by the at least one drive torque sources changes from one direction to the other, the method comprising, during a torque reversal operation, limiting the rate of change of torque generated by the at least one of the plurality of drive torque sources as the amount of torque generated passes through zero and attempting to compensate for the reduction in rate of change of torque by a corresponding change in the amount of torque generated by one or more other of the plurality of drive torque sources.

The method may comprise causing a first drive torque source to apply a positive drive torque to a first group of one or more wheels to which the first drive torque source is coupled and to causing a second drive torque source to apply a negative drive torque to a second group of one or more wheels to which the second drive torque source is coupled, such that a net drive torque applied to wheels of the vehicle corresponds substantially to the predetermined drive torque demand value.

In a further aspect of the invention for which protection is sought there is provided a method of controlling a motor vehicle comprising controlling an amount of torque generated by each of a plurality of drive torque sources, each drive torque source being coupled via a respective torque transfer arrangement to a respective group of one or more wheels, the method comprising limiting the rate of change of drive torque generated by a drive torque source when the amount of drive torque generated by said drive torque source approaches zero and reverses direction.

In one aspect of the invention for which protection is sought there is provided a non-transitory computer readable carrier medium carrying computer readable code for controlling a vehicle to carry out the method of any preceding aspec.

In an aspect of the invention for which protection is sought there is provided a computer program product executable on a processor so as to implement the method of any preceding aspect.

In a further aspect of the invention for which protection is sought there is provided a computer readable medium loaded with the computer program product of a preceding aspect.

In one aspect of the invention for which protection is sought there is provided a processor arranged to implement the method of any preceding aspect, or the computer program product of a preceding aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying drawings, in which.

DETAILED DESCRIPTION

Figure 1:
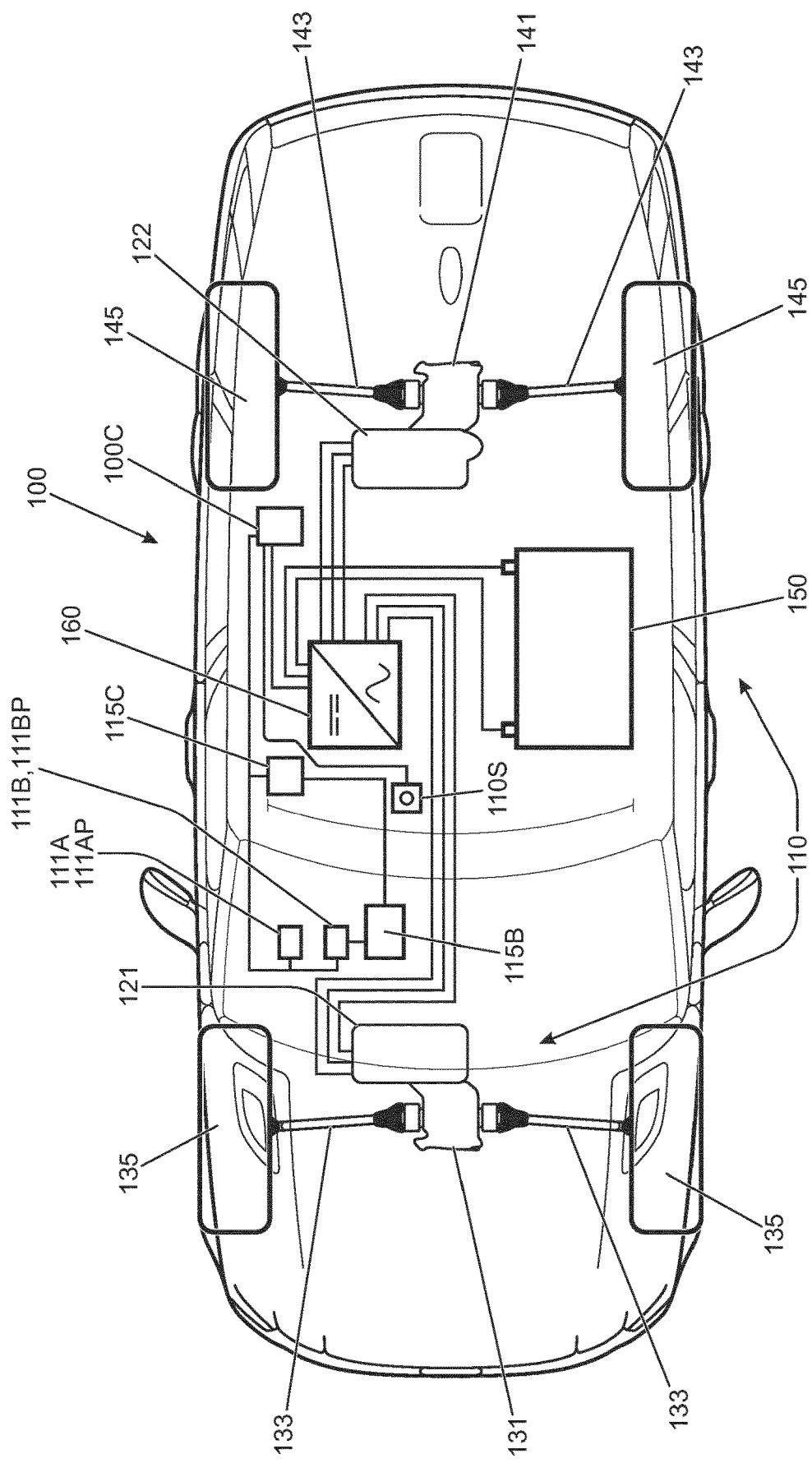
FIG. 1 is a schematic illustration of a vehicle according to an embodiment of the present invention having a first torque generator for driving front wheels of the vehicle and a second torque generator for driving rear wheels of the vehicle.

FIG. 1 is a schematic illustration of a vehicle 100 according to an embodiment of the present invention. The vehicle 100 has a powertrain 110 having first and second electric machines 121, 122 each operable as a propulsion motor (generating positive drive torque in the direction of rotation of the electric machine or as a generator (generating electrical charge by applying negative drive torque, being drive torque in a direction that is against the actual direction of rotation of the electric machine). The first electric machine 121 is arranged to drive a pair of front wheels 135 of the vehicle via a first torque transfer arrangement of the powertrain 110 that has a front differential gearbox 131 and a pair of front half shafts 133. The second electric machine 122 is arranged to drive a pair of rear wheels 145 of the vehicle via a second torque transfer arrangement of the powertrain 110 that has a rear differential gearbox 141 and a pair of rear half shafts 143. The electric machines 121, 122 may be powered so as to act as propulsion motors by means of a battery pack 150 via an inverter 160. The inverter 160 converts a supply of direct current (DC) from the battery pack 150 to an alternating current (AC) supply to drive the electric machines 121, 122 when required. When either or both of the electric machines 121, 122 are operated as electric generators, the inverter 160 converts AC current generated by the electric machines 121, 122 to DC current to charge the battery 150.

A powertrain controller 110C is connected to the inverter 160 and controls operation of the electric machines via the inverter 160. In particular, the powertrain controller 110C controls the amount and direction of torque generated by the motors 121, 122. The powertrain controller 110C is also in communication with an accelerator pedal module 111A having a driver operated accelerator pedal 111AP and a brake pedal module 111B having a driver operated brake pedal 111BP. The powertrain controller 110C receives electrical signals indicative of the position of the accelerator and brake pedals 111AP, 111BP from the respective modules 111A, 111B with respect to an allowable range of travel of the respective pedals 111AP, 111 BP. In some alternative embodiments the brake pedal module 111B may be configured to measure pressure applied to the brake pedal 111BP rather than travel or displacement. However it is to be understood that, where displacement or travel is measured, the signal indicative of travel may be indicative of the amount of pressure applied. This is because the amount of travel may be dependent on pressure applied, as in the present embodiment, since the accelerator and brake pedals 111AP, 111BP are configured to act against resilient elements such as helical spring elements that oppose movement of the respective pedal 111AP, 111BP with a force that increases with increasing travel.

The powertrain controller 110C is configured to control the electric machines 121, 122 to deliver a total combined amount of drive torque to the wheels 135, 145 that is substantially equal to that demanded by a driver by means of the accelerator pedal 111AP. The powertrain controller 110C is also configured to simulate compression braking normally exhibited by vehicles driven by combustion engines. Thus, when a driver releases the accelerator pedal 111AP the powertrain controller 110C may cause one or both of the electric machines to deliver negative drive torque to the associated wheels to simulate compression braking by effecting regenerative braking. It is to be understood that in some embodiments the amount of brake force that the electric machines 121, 122 are capable of generating may exceed that which an engine may be capable of by compression braking, enabling a not insubstantial amount of energy to be recovered by regenerative braking.

The vehicle 100 also has a brake controller 115C that is configured to control a foundation braking system 115B that is both mechanically and electrically coupled to the brake pedal module 111B, and electrically coupled to the powertrain controller 110C. The brake controller 115C is configured to cause the powertrain controller 110C to effect regenerative braking in response to actuation of the brake pedal 111 BP. If the powertrain controller 110C is unable to provide sufficient brake force by causing the first and second electric machines 121, 122 to operate as generators, or is unable sufficiently quickly to generate a required brake force by regenerative braking alone whilst mitigating the effects of backlash by reducing or limiting the rate of change of drive torque as described herein, the brake controller 115C causes the foundation braking system 115B to apply friction braking to the front and/or rear wheels 135, 145 of the vehicle 100.

In use, with the vehicle 100 substantially stationary and prior to commencing motion over a surface, the powertrain controller 110C is configured to cause the first electric machine 121 to develop positive drive torque in a reverse direction of travel and the second electric machine 122 to develop positive drive torque in a forward direction of travel. This configuration causes the first and second torque transfer arrangements to be placed in a condition of static torque loading in opposite senses. In the static torque loading condition drive gears forming part of the torque transfer arrangements become meshed in the respective directions of torque loading. This condition is assumed by the powertrain 110 under the control of the powertrain controller 110C when a forward drive mode of vehicle operation is selected by means of a forward/reverse driving mode selector 110S. The selector is switchable between a park mode P, a reverse driving mode D and a forward driving mode D. The powertrain controller 110C permits a transition between modes when the vehicle 100 is held stationary with the accelerator pedal 111AP undepressed (i.e. in a released condition) and the brake pedal 111BP applied sufficiently to maintain the vehicle 100 stationary.

If the park mode P is selected, the powertrain controller 110C causes substantially no torque to be developed by either of the first and second electric machines 121, 122.

As noted above, if the forward drive mode D is selected, the powertrain controller 110C causes the first electric machine 121 to develop positive drive torque in a reverse direction, opposing forward movement of the vehicle 100, whilst the second electric machine 122 is caused to develop positive drive torque in a forward direction of travel of the vehicle 100. In the forward drive mode D, the powertrain controller 110C is configured to cause the amount of torque developed in the forward direction to exceed that in the reverse direction by a sufficient amount to enable the vehicle 100 to achieve a desired forward creep speed when on a surface of sufficiently high surface coefficient of friction, 'surface mu', and both the accelerator and brake pedals 111AP, 111BP released.

If the reverse drive mode R is selected, the powertrain controller 110C again causes the first electric machine 121 to develop positive drive torque in the reverse direction, opposing forward movement of the vehicle 100, and the second electric machine 122 to develop positive drive torque in the forward direction of travel of the vehicle 100, in a similar manner to that when the forward drive mode D is selected, except that the net torque on the vehicle is arranged to be in the reverse direction and not the forward direction.

When motion of the vehicle 100 in the forward direction is required, the driver selects the forward drive mode (with the brake pedal 111 BP depressed) and releases the brake pedal 111BP. If the accelerator pedal 111AP is then depressed, the powertrain controller 110C causes a decrease in the amount of negative drive torque generated by the first electric machine 121 and an increase in the amount of positive drive torque generated by the second electric machine 122. The first electric machine 121 is operated as a generator, exerting negative drive torque on the front wheels 135. The first electric machine 121 causes regenerative braking to occur at the front wheels 135 as the vehicle 100 moves over the driving surface.

When it is required to slow the vehicle, the amount of negative torque applied by the first electric machine 121 may be increased and the amount of positive torque applied by the second electric machine 122 may be decreased, but maintained in a positive condition, acting against the negative torque applied by the first electric machine 121. This enables repeated backlash crossing of gears of the torque transfer arrangements associated with each electric machine 121, 122 to be avoided.

It is to be understood that the work done by the first electric machine 121 against the regenerative braking force applied by the second electric machine 122 may be at least partially recovered by the electrical energy generated by the second electric machine 121 whilst applying negative torque.

Importantly, by maintaining the first electric machine 121 and first torque transfer arrangement in a negative torque condition and the second electric machine 122 and second torque transfer arrangement in a positive torque condition during acceleration and deceleration of the vehicle, backlash of gears of the first and second torque transfer arrangements may be avoided, reducing noise, vibration and harshness (NVH) associated with vehicle operation. This may be particularly beneficial when executing a manoeuvre requiring repeated changes of direction of movement of the vehicle 100 in rapid succession such as when parking, which would otherwise result in repeated backlash of gears.

It is to be understood that application of positive torque to the rear wheels 145 (with respect to a forward direction of travel) and negative torque to the front wheels 135 (with respect to a forward direction of travel) rather than negative torque to the rear wheels 145 and positive torque to the front wheels 135 may be particularly advantageous because the weight transfer associated with acceleration and deceleration in the forward or reverse direction acts to increase the proportion of the weight of the vehicle 100 borne by the wheels that are developing forces to cause the acceleration or deceleration.

It is to be understood that, in the event that a relatively high rate of deceleration is demanded by a driver, for example by heavy pressing on the brake pedal 111 BP in an emergency braking scenario, the first electric machine 121 and in addition the second electric machine 122 may be employed to deliver regenerative braking and/or a friction-based foundation braking system may be employed to supplement the regenerative braking developed by one or both of the electric machines 121, 122.

In the present embodiment, the powertrain controller 110C is configured wherein, when the amount of driver demanded torque in the forward direction of driving approaches a threshold value from a value below the threshold value, in the present embodiment a value that is approaching the positive drive torque limit of the second electric machine 122, the first electric machine 121 is controlled to transition from a negative torque application condition to a positive torque application condition. The transition from the negative torque application condition to the positive torque application condition is controlled so that, as the amount of torque passes through zero, the rate of change of the amount of torque developed by the first electric machine 121 is reduced to a value not exceeding a predetermined torque rate limit value. This reduces the amount of NVH developed by the first torque transfer arrangement as gears of the first torque transfer arrangement experience a reversal of the direction of torque loading to which they are subject.

Once the torque reversal has taken place, the limit on the maximum allowable rate of change of torque developed by the first electric machine 121 is lifted. The first electric machine 121 is then controlled by the controller 110C, in combination with the second electric machine 122, in order to meet driver torque demand.

Figure 2:
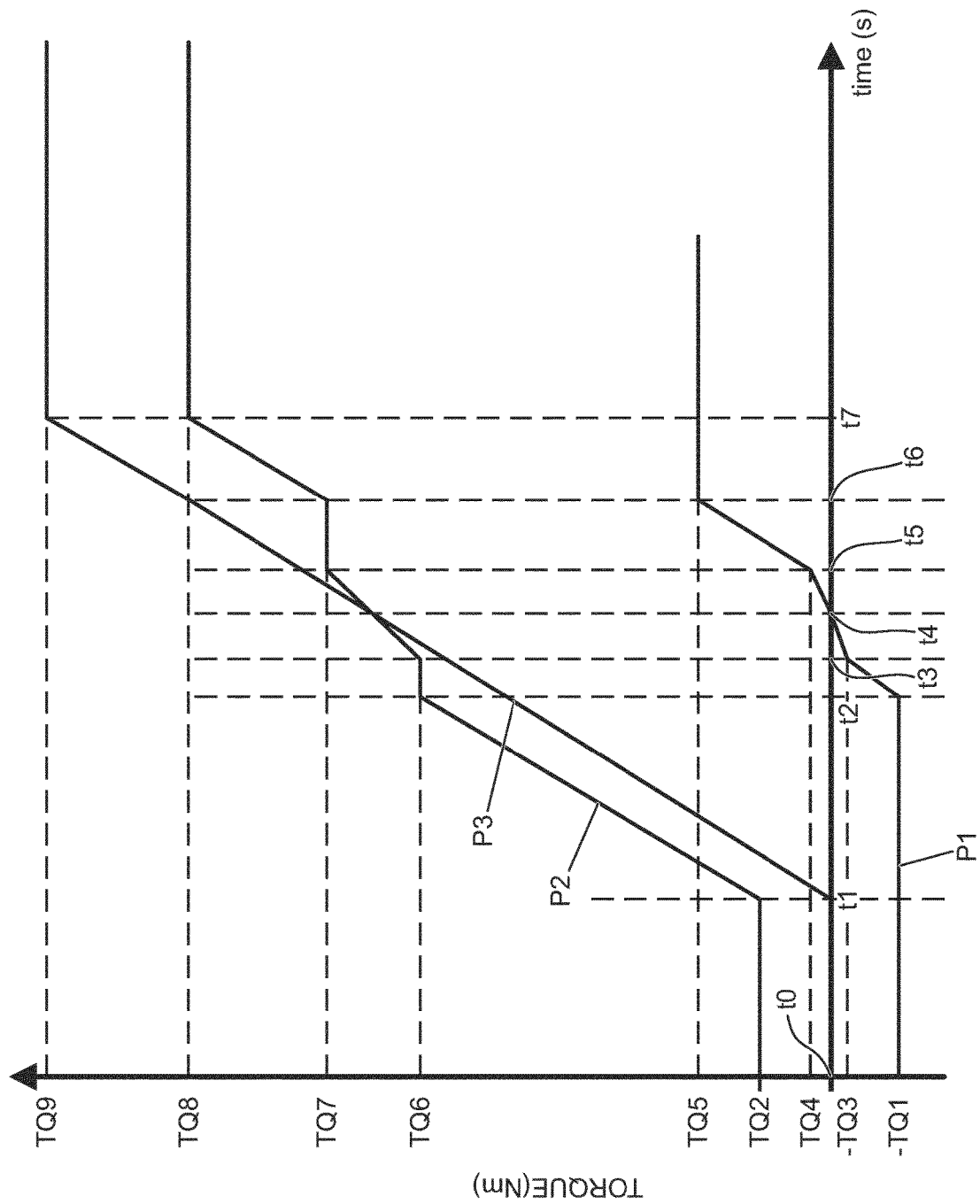
FIG. 2 is a plot of the amount of torque delivered by each of first and second torque generators of the vehicle of the embodiment of FIG. 1.

An example of the manner in which the powertrain controller 110C is configured to operate in the present embodiment is illustrated graphically in FIG. 2. Other configurations may be useful in some embodiments.

Trace P1 of FIG. 2 shows the amount of net torque generated by the first electric machine 121, trace P2 shows the amount of net torque generated by the second electric machine 122 and trace P3 shows the total amount of net torque generated by the first and second electric machines 121, 122 in combination.

Prior to time t0 the vehicle 100 is substantially stationary on substantially level ground with brake pedal 111 BP depressed. Since the vehicle 100 is stationary, depression of the brake pedal 111BP causes the friction-based foundation braking system 115B to apply brake pressure at the front and rear wheels 135, 145.

When the vehicle 100 is held stationary by means of the brake pedal 111BP and the forward driving mode D is selected by means of driving mode selector 110S then, as described above, powertrain controller 110C causes the first and second electric machines 121, 122 to apply similar amounts of drive torque to the front and rear wheels 135, 145, respectively, but in opposite senses such that the second electric machine 122 acts to drive the vehicle 100 in a forward direction whilst the first electric machine 121 acts to drive the vehicle 100 in a reverse direction opposite the forward direction. The amounts of torque generated by the first and second electric machines 121, 122 are arranged such that a net positive amount of drive force acts on the vehicle 100 in a forward direction if the forward drive mode D of the vehicle 100 is selected, this torque being opposed by the braking system 115B under the control of brake controller 115C due to depression of the brake pedal 111BP. In the present embodiment the first electric machine 121 causes a combined torque TQ1 of around −100 Nm to be applied to the front wheels 135 (the combined applied torque being substantially −100 Nm between the wheels, i.e. an average torque of −50 Nm per front wheel 135) whilst the second electric machine 122 causes a combined torque of TQ2 of around 500 Nm to be applied by the rear wheels 145 (the combined applied torque being substantially 500 Nm between the wheels, i.e. an average torque of 250 Nm per rear wheel 145). A net torque of 300 Nm is therefore applied to the wheels by the first and second electric machines 121, 122.

At time t0 the driver releases the brake pedal 111 BP. Upon release of the brake pedal 111BP the friction braking system 115B is released under the control of the brake controller 115C. Since a net torque in a forward direction of vehicle travel exists, the vehicle 100 begins to accelerate in a forward direction provided the net torque is sufficient to overcome frictional and any other resistance to movement.

It is to be understood that if the vehicle 100 is held stationary by the braking system 115B in the reverse drive mode R, the powertrain controller 110C is configured in the present embodiment to cause the first electric machine to exert a torque in a reverse direction (negative torque) on the front wheels 135 totalling substantially 500 Nm (250 Nm per wheel) and the second electric machine 122 to exert a torque in a forward direction on the rear wheels 145 totalling substantially 100 Nm (50 Nm per wheel) such that a net torque on the vehicle 100 due to the electric machines 121, 122 acts in the reverse direction, i.e. the direction of intended movement when in the reverse drive mode R. Thus, selection of the forward drive mode D results in the application of torque by the first and second electric machines 121, 122 in the same direction as in the case the reverse drive mode R is selected, the relative amounts of torque differing according to whether the forward drive mode D or reverse drive mode R is selected.

In some alternative embodiments, instead of a net positive torque being caused to be applied by the powertrain controller 110C in the forward direction when the vehicle is stationary in the forward drive mode D, and a net positive torque in the reverse direction when the vehicle is stationary in the reverse drive mode R, the powertrain controller 110C may be configured to cause a net torque of substantially zero to be applied under similar conditions. Other arrangements may be useful.

At time t1 in the example of FIG. 2 the driver depresses the accelerator pedal 111AP. The powertrain controller 110C responds by causing the amount of positive drive torque developed by the second electric machine 122 to start to increase.

At time t2 the second electric machine 122 is developing approximately 50% of its maximum allowable continuous torque, TQ6 and the driver is still demanding an increase in drive torque. The controller 110C causes the amount of torque generated by the second electric machine 122 to stop increasing and, substantially simultaneously, begins to reduce the amount of negative torque generated by the first electric machine 121.

The controller 110C causes the amount of negative torque developed by the first electric machine 121 to decrease at a rate that is determined according to the amount of torque demanded by the driver, as determined by the powertrain controller 110C in dependence on accelerator pedal position and vehicle speed. In the present embodiment, the powertrain controller 110C implements a torque filter that may be referred to as a 'drivability filter'. A 'raw' value of driver torque demand based on accelerator pedal position and vehicle speed is input to the filter, which outputs a smoothed driver torque demand value. The controller 110C controls the first and second electric machines 121, 122 to deliver a net torque averaged over the wheels of the vehicle that is substantially equal to the smoothed driver torque demand value. The purpose of the filter is to smooth driver torque demand such that the net rate of change torque averaged over each driven wheel does not become excessively large if a driver rapidly depresses or releases the accelerator pedal 111AP.

When the amount of torque developed by the first electric machine 121 reaches a predetermined value, −TQ3, of around −10 Nm, at time t3, the powertrain controller 110C causes a decrease in the rate of change of torque developed by the first electric machine 121 so that the rate does not exceed a predetermined torque reversal rate limit. It is to be understood that no decrease in rate of change of torque will be required if the rate of change is already less than or equal to the predetermined torque reversal rate limit. Substantially simultaneously, the controller 110C causes the amount of torque developed by the second electric machine 122 to increase at a rate such that the net torque applied by the first and second electric machines 121, 122 meets the prevailing driver torque demand (post drivability filter), i.e. such that the net rate of change of torque averaged over each driven wheel of the vehicle 100 meets the predetermined (smoothed) driver torque demand. The transition between different electric machines 121, 122 causing the increase in net drive torque is arranged to be substantially seamless, such that any increase in NVH associated with the transition is negligible.

In the present embodiment, the predetermined torque reversal rate limit is a substantially constant value under all driving conditions and is determined empirically to be a value that results in relatively little or no NVH being perceived by a user when the amount of torque applied by the first electric machine 121 undergoes torque reversal at time t4. In the present embodiment the predetermined torque reversal rate limit is around 3-20 Nm per second although other values may be useful in some embodiments. Thus, the torque may transition from −10 Nm to +10 Nm in around 1 s in some embodiments.

The predetermined torque reversal rate limit may in some alternative embodiments be dependent on vehicle speed and/or accelerator pedal position. For example in some embodiments the predetermined torque reversal rate limit may increase with vehicle speed, since it may be determined that a vehicle occupant is less sensitive to NVH associated with torque reversal at higher vehicle speeds due for example at least in part to masking of the NVH associated with torque reversal by additional sources of NVH such as NVH associated with tyres of the vehicle and/or airflow over the vehicle. In addition or instead, the predetermined torque reversal rate limit may be arranged to increase with increasing driver torque demand since a driver may be willing to tolerate higher levels of NVH associated with torque reversal when demanding higher acceleration rates, for example when performing an overtaking manoeuvre.

Once the torque reversal has taken place, at time t5 the powertrain controller 110C determines that the amount of driver torque demand is continuing to increase. The controller 110C halts further increase in the amount of torque generated by the second electric machine 122 and causes the amount of torque generated by the first electric machine 121 to increase according to the rate of increase of driver torque demand. At time t6 the amount of torque developed by the first electric machine 121 reaches its maximum allowable continuous value TQ5. Accordingly, at time t6 the controller 110C causes the second electric machine 122 to increase the amount of torque generated thereby, until at time t7 the driver torque demand no longer increases, and remains substantially constant. At time t7, the first electric machine 121 is developing a substantially continuous torque of value TQ5 whilst the second electric machine 122 is developing a substantially continuous torque of value TQ8, resulting in a total net torque applied across the four wheels 135, 145 of value TQ9.

As described above, embodiments of the present invention have the advantage that, in vehicles having independent drive torque sources coupled to respective different groups of one or more wheels via a respective geared torque transfer arrangement, an amount of NVH experienced by a vehicle occupant when a reversal in the direction of torque applied to a torque transfer arrangement takes place may be reduced, optionally to a substantially imperceptible level, optionally substantially to zero, whilst vehicle response to driver torque demand remains substantially unaffected. Some embodiments of the invention have the advantage that substantially no torque reversal need take place when driver demanded torque is below a certain value since the propulsion source driving one group of one or more wheels may continue to provide positive drive torque whilst the propulsion source driving another group of one or more wheels provides negative torque. The powertrain controller 110C may adjust the amount of positive drive torque provided by the propulsion source that continues to provide positive drive torque, and optionally the amount of negative drive torque provided by the other propulsion source, in order that the total torque delivered by the propulsion sources 121, 122 continues to meet the amount demanded by the driver. It is to be understood that the amount of torque demanded by the driver may be substantially constant, or increasing or decreasing. Nevertheless, the powertrain controller 110C may control the propulsion sources such that driver torque demand is met substantially seamlessly.

It is to be understood that torque reversal operations may take placed during periods of acceleration or deceleration of a vehicle. In some embodiments torque reversal operations may be caused to take place under certain conditions when the amount of driver demanded torque is substantially constant, in order to prepare the vehicle for subsequent acceleration or deceleration events before driver torque demand increases or decreases.

For example, in some embodiments, if (say) the first and second electric machines 121, 122 are both delivering positive drive torque and the amount of driver demanded torque reduces to a sufficiently low (but positive) value, the powertrain controller 110C may cause the first electric machine 121 to transition from delivering positive drive torque to delivering negative drive torque whilst the second electric machine 122 continues to deliver positive drive torque. This is at least in part in anticipation of the possibility that regenerative braking may be required if the driver reduces the amount of demanded torque further.

Thus, the controller 110C may anticipate a future increase or decrease in torque demand, and prepare the powertrain accordingly. In some embodiments the controller 110C may be configured to receive data indicative of the gradient of terrain ahead of the vehicle. In the event the gradient is positive, i.e. inclined upwardly, the controller 110C may prepare the powertrain for an increase in torque demand and ensure that both electric machines 121, 122 are developing positive drive torque. In the event the gradient is negative, i.e. inclined downwardly, the controller 110C may prepare the powertrain for a decrease in torque demand, and a scenario in which the powertrain may be required to develop negative drive torque, i.e. develop a net torque in a direction opposite the direction of travel. Accordingly, in such a situation, if both electric machines 121, 122 are developing positive drive torque the controller 110C may cause at least one of the electric machines, such as the first electric machine 121, to transition to delivering negative drive torque, i.e. positive drive torque in the reverse direction opposite the forward direction of travel. The second electric machine may be controlled to deliver an additional amount of positive (forward) drive torque so that the net drive torque remains substantially unchanged. As a consequence, the first torque transfer arrangement associated with the first electric machine 121 undergoes a lash crossing in which the direction of torque transfer reverses direction such that, if a relatively rapid increase in negative drive torque is subsequently required, to implement regenerative braking, relatively harsh NVH associated with torque reversal in response to accelerator pedal lift off or brake pedal depression is avoided.

The powertrain controller 110C reduces the rate of change of torque generated by the first electric machine 122 as the torque generated by the first electric machine 121 reverses direction so that the rate does not exceed the predetermined torque reversal rate limit, reducing NVH associated with backlash of gears of the first torque transfer arrangement. The amount of torque generated by the second electric machine 122 is controlled so as to maintain the driver demanded torque as the transition to negative torque generation by the first electric machine 121 takes place.

If both the first and second electric machines 121, 122 are delivering positive drive torque and the amount of driver demanded torque reduces to a value sufficiently low to require both motors 121, 122 to provide regenerative braking, the powertrain controller 110C may cause one of the first and second electric machines 121, 122 to transition from delivering positive drive torque to delivering negative drive torque and subsequently cause the other of the first and second electric machines 121, 122 to transition from delivering positive drive torque to delivering negative drive torque. In both cases, the powertrain controller 110C attempts to reduce the rate of change of torque generated by the respective electric machine 121, 122 undergoing torque reversal as the torque generated by the electric machine 121, 122 reverses direction, so as to reduce NVH associated with backlash of gears of the respective torque transfer arrangements. The amount of torque generated by the electric machine 121, 122 not experiencing torque reversal at that time is controlled so as to provide a desired value of net torque at the wheels 135, 145 of the vehicle 100. Thus the control of torque applied to the torque transfer arrangements by the respective motors 121, 122 allows substantially seamless transitions between positive and negative values of applied torque and between negative and positive values of applied torque that are substantially imperceptible to a driver. It is to be understood that in some embodiments one electric machine 121, 122 may be permitted to exceed one or more normal maximum steady state performance parameter values for a relatively short period of time whilst the other electric machine 122, 121 undergoes torque reversal. Thus, for example, in some embodiments one electric machine 121, 122 may be permitted transiently to deliver an amount of torque exceeding the amount for which it is rated under steady state conditions in order to compensate for a reduction in the amount of torque delivered by the other 122, 121.

It is to be understood that, in some embodiments, an engine may be provided in addition to the first and second electric machines 121, 122. Thus the vehicle 100 may be a hybrid electric vehicle in some embodiments. The hybrid vehicle may be a parallel hybrid vehicle in which the engine is configured to deliver drive torque to one or more wheels, or a series hybrid vehicle in which the engine is configured to power a generator to generate electrical power when required to charge the battery or drive one or both of the electric machines 121, 122.

Embodiments of the present invention have the advantage that NVH associated with powertrain gear backlash when a portion of the powertrain undergoes torque reversal may be substantially eliminated or at least reduced, optionally to a substantially imperceptible level.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a motor vehicle powertrain, the controller configured to:

control an amount of torque generated by each of a plurality of drive torque sources in order to generate a net torque corresponding to a predetermined torque demand value, the predetermined torque demand value being determined at least in part by reference to a torque demand signal received by the controller, wherein each of the plurality of drive torque sources is coupled via a respective torque transfer arrangement to a respective group of one or more wheels;

cause at least one of the plurality of drive torque sources to generate positive or negative torque in dependence on the predetermined torque demand value and to cause the at least one of the plurality of drive torque sources to undergo a torque reversal operation in which a direction of torque generated by the at least one of the plurality of drive torque sources changes from one direction to another direction; and during a torque reversal operation, limit a rate of change of torque generated by the at least one of the plurality of drive torque sources as an amount of torque generated passes through zero and attempts to compensate for a reduction in the rate of change of torque by a corresponding change in the amount of torque generated by one or more other of the plurality of drive torque sources.

2. The controller according to claim 1, wherein the controller is further configured to cause a first one of the plurality of drive torque sources to apply a positive drive torque to a first group of the one or more wheels to which the first one of the plurality of drive torque sources is coupled and to cause a second one of the plurality of drive torque sources to apply a negative drive torque to a second group of the one or more wheels to which the second one of the plurality of drive torque sources is coupled, such that a net drive torque applied to wheels of the vehicle corresponds substantially to the predetermined drive torque demand value.

3. The controller according to claim 2, wherein, when a predetermined one or more conditions is met, the controller is further configured to permit a reversal of a direction of drive torque generated by one or both of the first and second ones of the plurality of drive torque sources.

4. The controller according to claim 3, wherein the controller is further configured to cause a reversal of direction of drive torque generated by one of the first and second ones of the plurality of drive torque sources from a reverse direction of travel of the vehicle to a forward direction while the vehicle is accelerating.

5. The controller according to claim 3, wherein the controller is further configured to cause a reversal of direction of drive torque generated by one of the first and second ones of the plurality of drive torque sources from a forward direction of travel of the vehicle to a reverse direction of travel while the vehicle is decelerating.

6. The controller according to claim 1, wherein the controller is further configured, when the amount of drive torque generated by the at least one of the plurality of drive torque sources approaches zero and reverses direction, to limit a rate of change of drive torque generated by the at least one of the plurality of drive torque sources so as not to exceed a predetermined rate limit value.

7. The controller according to claim 6, wherein the predetermined rate limit value is dependent at least in part on at least one of vehicle speed and the drive torque demand amount.

8. The controller according to claim 7, wherein the predetermined rate limit value is higher for higher values of one or both of the vehicle speed and the drive torque demand amount.

9. The controller according to claim 1, wherein the controller is further configured to cause at least one of the plurality of drive torque sources comprising at least one electric machine to generate positive or negative torque in dependence on the predetermined torque demand value.

10. The controller according to claim 1, further comprising an electronic processor having an electrical input for receiving the torque demand signal, and an electronic memory device electrically coupled to the electronic processor and having instructions stored therein, and
wherein the controller is further configured to cause the at least one of the plurality of drive torque sources to undergo a torque reversal operation in which a direction of torque generated by the at least one of the plurality of drive torque sources changes from one direction to another direction, and
wherein the processor is configured to access the memory device and execute the instructions stored therein, during a torque reversal operation.

11. A vehicle comprising a body, a plurality of wheels, a powertrain to drive the plurality of wheels, a braking system to brake the plurality of wheels, a plurality of drive torque sources and the controller according to claim 1.

12. The vehicle according to claim 11, wherein at least one of the drive torque sources comprises at least one electric machine.

13. The vehicle according to claim 12, wherein one or more of the plurality of drive torque sources each comprise at least one electric machine.

14. The vehicle according to claim 11, further comprising an engine.

15. A method of controlling a motor vehicle powertrain via a controller, the method comprising:
controlling an amount of torque generated by each of a plurality of drive torque sources in order to generate a net torque corresponding to a predetermined torque demand value, the predetermined torque demand value being determined at least in part by reference to a torque demand signal received by the controller, each of the plurality of drive torque sources being coupled via a respective torque transfer arrangement to a respective group of one or more wheels;
causing at least one of the plurality of drive torque sources to generate positive or negative torque in dependence on the predetermined torque demand value and causing the drive torque source to undergo a torque reversal operation in which a direction of torque generated by the at least one of the drive torque sources changes from one direction to another direction; and
during a torque reversal operation, limiting a rate of change of torque generated by the at least one of the plurality of drive torque sources as an amount of torque generated passes through zero and attempting to compensate for a reduction in the rate of change of torque by a corresponding change in an amount of torque generated by one or more other of the plurality of drive torque sources.

16. The method according to claim 15, further comprising causing a first one of the plurality of drive torque sources to apply a positive drive torque to a first group of the one or more wheels to which the first one of the plurality of drive torque sources is coupled, and causing a second one of the plurality of drive torque sources to apply a negative drive torque to a second group of the one or more wheels to which the second one of the plurality of drive torque sources is coupled, such that a net drive torque applied to wheels of the vehicle corresponds substantially to the predetermined drive torque demand value.

17. A method of controlling a motor vehicle, the method comprising:
controlling an amount of torque generated by each of a plurality of drive torque sources, each drive torque source being coupled via a respective torque transfer arrangement to a respective group of one or more wheels; and
limiting a rate of change of drive torque generated by one of the plurality of drive torque sources when an amount of drive torque generated by the one of the plurality of drive torque sources approaches zero and reverses direction.

18. A computer program product comprising a non-transitory computer readable carrier medium having encoded thereon instructions that, when executed on a processor, cause the processor to perform the method of claim 15.

* * * * *